(12) United States Patent
Mulcaire

(10) Patent No.: US 9,222,369 B2
(45) Date of Patent: Dec. 29, 2015

(54) JOINT ASSEMBLY FOR AN ANNULAR STRUCTURE

(75) Inventor: Thomas G. Mulcaire, Derby (GB)

(73) Assignee: ROLLS-ROYCE plc, London (GB)

( * ) Notice: Subject to any disclaimer, the term of this patent is extended or adjusted under 35 U.S.C. 154(b) by 761 days.

(21) Appl. No.: 13/528,219

(22) Filed: Jun. 20, 2012

(65) Prior Publication Data

US 2013/0011253 A1    Jan. 10, 2013

(30) Foreign Application Priority Data

Jul. 8, 2011 (GB) ................................. 1111666.2

(51) Int. Cl.
| | | |
|---|---|---|
| *F01D 25/00* | (2006.01) | |
| *F01D 25/24* | (2006.01) | |
| *F01D 25/26* | (2006.01) | |
| *F16B 35/06* | (2006.01) | |

(52) U.S. Cl.
CPC ............ *F01D 25/243* (2013.01); *F01D 25/265* (2013.01); *F05D 2230/642* (2013.01); *F05D 2260/30* (2013.01); *F16B 35/06* (2013.01)

(58) Field of Classification Search
None
See application file for complete search history.

(56) References Cited

U.S. PATENT DOCUMENTS

| | | | | |
|---|---|---|---|---|
| 2,764,266 | A * | 9/1956 | Haworth ......................... | 403/22 |
| 2,936,667 | A * | 5/1960 | Thorberg ...................... | 411/393 |
| 3,726,549 | A * | 4/1973 | Bradley, Jr. .................. | 285/356 |
| 3,936,222 | A * | 2/1976 | Asplund et al. ................ | 416/95 |
| 5,226,788 | A * | 7/1993 | Fledderjohn ................. | 415/177 |
| 5,407,310 | A * | 4/1995 | Kassouni ....................... | 411/107 |
| 5,466,105 | A * | 11/1995 | McKay et al. .................. | 411/84 |
| 6,238,131 | B1 * | 5/2001 | Watts et al. .................... | 403/337 |
| 6,305,899 | B1 * | 10/2001 | Saunders ........................ | 415/9 |
| 6,401,563 | B1 * | 6/2002 | Franklin ........................ | 74/469 |
| 6,467,988 | B1 * | 10/2002 | Czachor et al. ............... | 403/337 |
| 7,121,758 | B2 * | 10/2006 | McMillan et al. ......... | 403/408.1 |
| 7,185,499 | B2 * | 3/2007 | Chereau et al. ................ | 60/796 |
| 7,234,916 | B2 * | 6/2007 | Lee et al. ...................... | 415/119 |
| 7,371,042 | B2 * | 5/2008 | Lee ................................ | 415/119 |
| 7,491,031 | B2 * | 2/2009 | Brault et al. .................. | 416/144 |
| 7,766,574 | B2 * | 8/2010 | Maffre .......................... | 403/337 |

(Continued)

FOREIGN PATENT DOCUMENTS

| | | |
|---|---|---|
| EP | 1 380 722 A1 | 1/2004 |
| EP | 1 683 942 A2 | 7/2006 |
| FR | 1 475 358 | 3/1967 |

OTHER PUBLICATIONS

Search Report issued in European Patent Application No. 12 17 2757 dated Jun. 10, 2014.

(Continued)

*Primary Examiner* — Victor MacArthur
(74) *Attorney, Agent, or Firm* — Oliff PLC

(57) ABSTRACT

A joint assembly for an annular structure comprises a first annular member having a first radially extending flange and a second annular member having a second radially extending flange. The first and second flanges having a plurality of first and second circumferentially aligned apertures. A plurality of fasteners are provided and each fastener is arranged to extend through a respective pair of the first and second apertures to join the first and second annular members together. The first and second radially extending flanges have a plurality of circumferentially aligned third and fourth apertures. A plurality of members are provided and each member is arranged to extend axially through a respective pair of the third and fourth apertures.

14 Claims, 5 Drawing Sheets

(56) References Cited

U.S. PATENT DOCUMENTS

| | | | |
|---|---|---|---|
| 7,854,586 B2* | 12/2010 | Major et al. | 415/160 |
| 2003/0053882 A1* | 3/2003 | Reuter | 411/107 |
| 2003/0118399 A1* | 6/2003 | Schilling et al. | 403/337 |
| 2005/0204746 A1* | 9/2005 | Chereau et al. | 60/796 |
| 2005/0238423 A1* | 10/2005 | Maffre | 403/408.1 |
| 2007/0086854 A1* | 4/2007 | Blanton | 403/338 |
| 2007/0119181 A1* | 5/2007 | Lohmueller et al. | 60/796 |
| 2007/0125924 A1* | 6/2007 | Arakawa | 248/340 |
| 2008/0008589 A1* | 1/2008 | Lee | 416/144 |
| 2009/0162139 A1* | 6/2009 | Miller et al. | 403/296 |
| 2010/0310358 A1* | 12/2010 | Major et al. | 415/159 |
| 2010/0316484 A1* | 12/2010 | Jasko et al. | 415/1 |
| 2013/0011253 A1* | 1/2013 | Mulcaire | 415/214.1 |

OTHER PUBLICATIONS

Search Report issued in British Patent Application No. 1111666.2 dated Nov. 8, 2011.

* cited by examiner

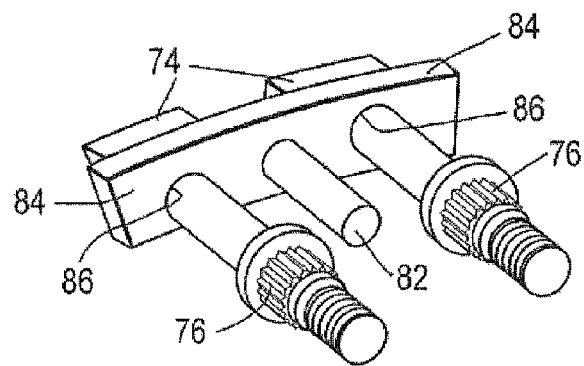
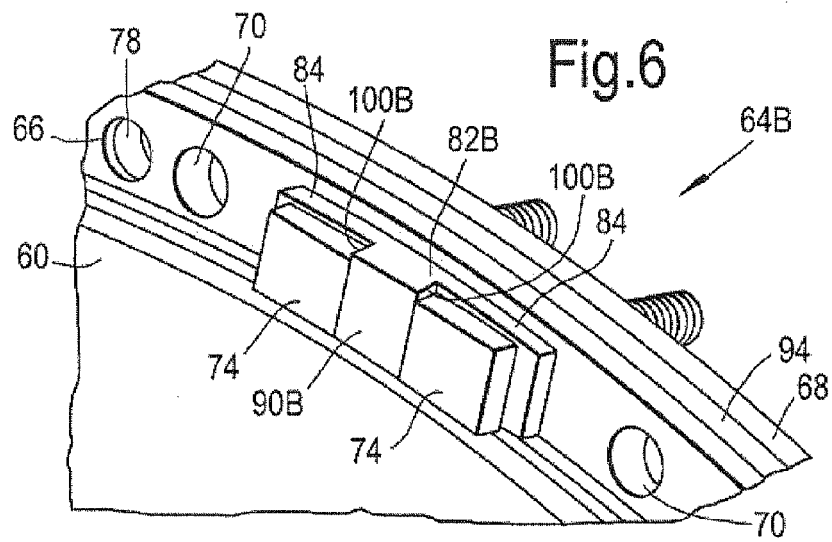
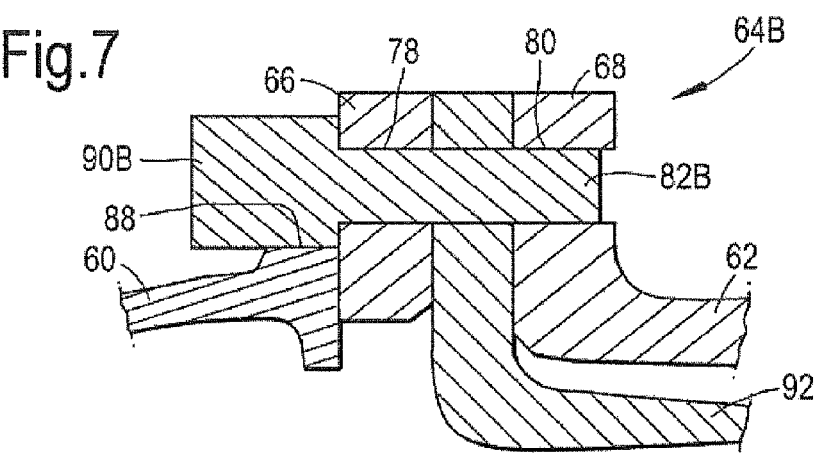

JOINT ASSEMBLY FOR AN ANNULAR STRUCTURE

The present invention relates to a joint assembly for an annular structure and the present invention relates in particular to a joint assembly for joining annular casings of a gas turbine engine and more particularly to a joint assembly for joining annular casings of a fan containment casing of a turbofan gas turbine engine.

U.S. Pat. No. 2,764,266 describes a joint assembly for an annular structure comprising a first annular member having a first radially extending flange, a second annular member having a second radially extending flange, the first radially extending flange having a plurality of circumferentially spaced first apertures extending axially there-through, the second radially extending flange having a plurality of circumferentially spaced second apertures extending axially there-through, the first and second apertures being circumferentially aligned, a plurality of fasteners and a plurality of hollow dowel pins, each hollow dowel pin is arranged to extend through a respective pair of the first and second apertures and each fastener being arranged to extend through a respective hollow dowel pin in the respective pair of the first and second apertures to join the first and second annular members together.

This type of joint assembly is used in gas turbine engines to join casing sections together, for example to join fan casing sections, to join compressor casing sections, compressor casing to a combustion casing, a combustion casing to a turbine casing and/or turbine sections together. In this type of joint assembly the fasteners are protected from being sheared in the event of a fan blade off event by the hollow dowel pins located in the aligned apertures in the flanges which provide circumferential location. The hollow dowel pins also provide radial location and provide accurate alignment of turbine shrouds, or turbine abradable liners, relative to the turbine rotor blades in the low pressure turbine.

However, it has been found that the downstream flange of a combustor casing is overstressed due to a transient thermal gradient caused by hot gases on the radially inner surface of the combustor casing increasing the temperature of the radially inner end of the flange quicker than the rest of the flange. The magnitude of the stress is proportional to the thermal gradient and the thermal gradient is proportional to the radial height of the flange.

A potential solution to the problem is to reduce the radial height of the flange. However, the use of hollow dowel pins limits the reduction in the radial height of the flange.

Accordingly the present invention seeks to provide a joint assembly which reduces, preferably overcomes, the above mentioned problem.

Accordingly the present invention provides a joint assembly for an annular structure comprising a first annular member having a first radially extending flange, a second annular member having a second radially extending flange, the first radially extending flange having a plurality of circumferentially spaced first apertures extending axially there-through, the second radially extending flange having a plurality of circumferentially spaced second apertures extending axially there-through, the first and second apertures being circumferentially aligned, a plurality of fasteners, each fastener being arranged to extend through a respective pair of the first and second apertures to join the first and second annular members together, characterised in that the first radially extending flange having a plurality of circumferentially spaced third apertures extending axially there-through, the second radially extending flange having a plurality of circumferentially spaced fourth apertures extending axially there-through, the third and fourth apertures being circumferentially aligned, a plurality of members, each member being arranged to extend axially through a respective pair of the third and fourth apertures, each member having at least one circumferentially extending flange, each circumferentially extending flange having an aperture extending axially there-though and each fastener extending through an aperture in a flange of a member to clamp the member against the first flange.

Each member may have two circumferentially extending flanges.

The fasteners may comprise Tee headed bolts and nuts or Dee headed bolts and nuts.

The first annular member may have a raised annular land adjacent the first flange and the heads of the bolts being arranged to abut the raised annular land to prevent rotation of the bolts.

Each member may have an axially extending member to prevent rotation of the bolts.

The axially extending member may be positioned circumferentially between the two circumferentially extending flanges and between the heads of two bolts.

The axially extending member may comprise a flange extending circumferentially and being positioned at the radially outer end of the member.

Each member may extend beyond the second flange.

The joint assembly may comprise a plurality of plates, each plate having an aperture, each fastener extending through an aperture in a plate and locating an associated nut to clamp the plate against the second flange.

The fasteners may comprise shank nuts and bolts, the shank nuts being secured to the flange of the member.

The first and second annular members may be casings.

A third annular member having a third radially extending flange, the third radially extending flange having a plurality of circumferentially spaced fifth apertures extending axially there-through, the first, second and fifth apertures being circumferentially aligned, the third radially extending flange having a plurality of circumferentially spaced sixth apertures extending axially there-through, the third, fourth and sixth apertures being circumferentially aligned.

The first annular member may be a combustion casing and the second annular member may be a turbine casing.

The present invention will be more fully described by way of example with reference to the accompanying drawings, in which:

FIG. 5 is a perspective view of a pair of fasteners and a member shown in FIG. 2.

FIG. 6 is an enlarged perspective view of a portion of an alternative joint assembly according to the present invention.

FIG. 7 is a cross-sectional view along line C-C in FIG. 6.

Figure 1:
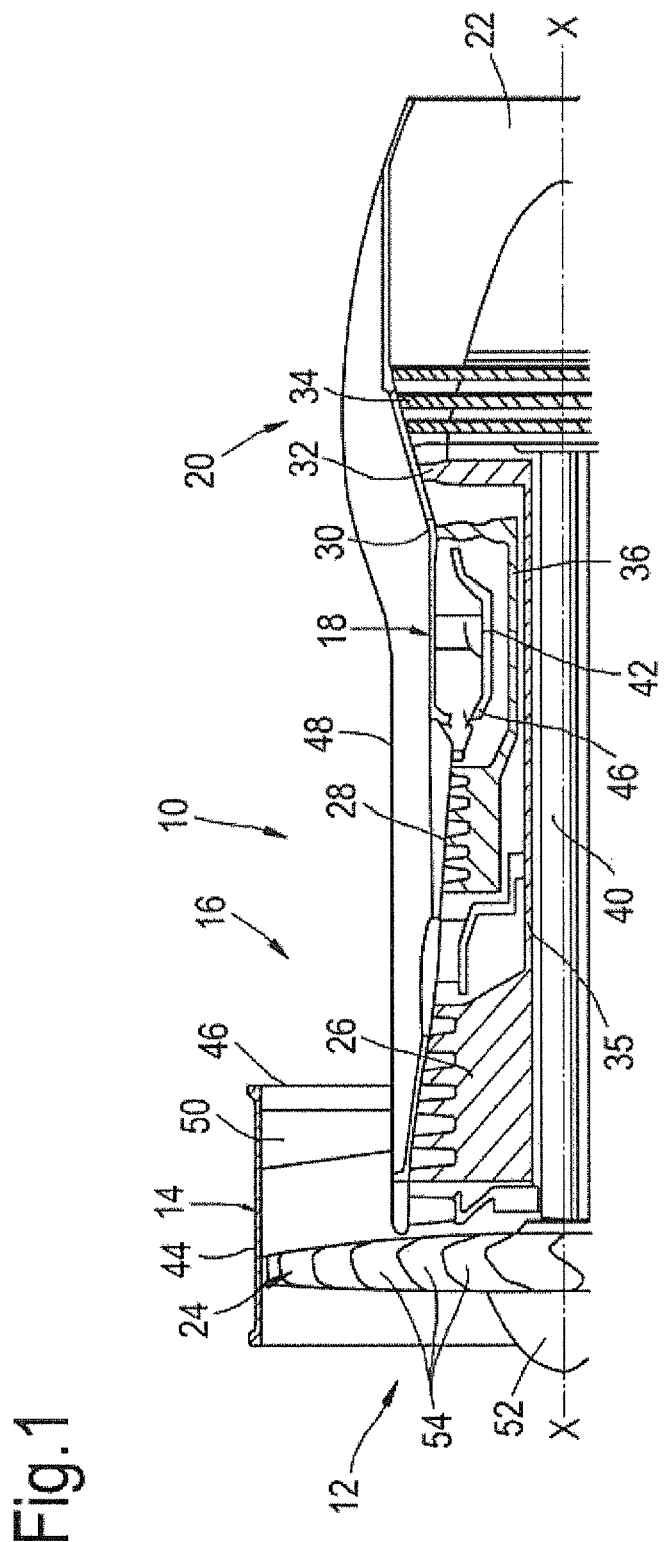
FIG. 1 is a partially cut away view of a turbofan gas turbine engine having a joint assembly according to the present invention.

A turbofan gas turbine engine 10, as shown in FIG. 1, comprises in flow series an inlet 12, a fan section 14, a compressor section 16, a combustion section 18, a turbine section 20 and an exhaust 22. The fan section 14 comprises a fan 24. The compressor section 16 comprises in flow series an intermediate pressure compressor 26 and a high pressure compressor 28. The turbine section 20 comprises in flow series a high pressure turbine 30, an intermediate pressure turbine 32 and a low pressure turbine 32. The fan 24 is driven by the low pressure turbine 34 via a shaft 40. The intermediate pressure compressor 26 is driven by the intermediate pressure turbine 32 via a shaft 38 and the high pressure compressor 28 is driven by the high pressure turbine 30 via a shaft 36. The turbofan gas turbine engine 10 operates quite conventionally and its operation will not be discussed further. The turbofan gas turbine engine 10 has a rotational axis X.

The fan section 14 comprises a fan duct 42 defined partially by a fan casing 44. The fan duct 42 has the intake 12 at its axially upstream end and an outlet 46 at its axially downstream end. The fan casing 44 is secured to a core engine casing 48 by a plurality of radially extending fan outlet guide vanes 50. The fan casing 44 surrounds the fan 24 and the fan 24 comprises a fan rotor 52, which carries a plurality of circumferentially spaced radially extending fan blades 54. The fan rotor 52 and fan blades 54 rotate about the axis X of the turbofan gas turbine engine 10.

The combustion section 18 comprises a combustion casing 60 and the turbine section 20 comprises a turbine casing 62, as shown more clearly in FIGS. 2 to 5. A joint assembly 64 for an annular structure according to the present invention is shown in FIGS. 2 to 5. The joint assembly 64 comprises a first annular member, the combustion casing, 60 having a first radially extending flange 66, a second annular member, the turbine casing 62, having a second radially extending flange 68. The first radially extending flange 66 has a plurality of circumferentially spaced first apertures 70 extending axially there-through and the second radially extending flange 68 have a plurality of circumferentially spaced second apertures 72 extending axially there-through. The first and second apertures 70 and 72, more particularly the axes of the first and second apertures 70 and 72, respectively are circumferentially and radially aligned. A plurality of fasteners 74 are provided and each fastener 74 is arranged to extend through a respective pair of the first and second apertures 70 and 72 respectively to join the first and second annular members, combustion casing and turbine casing, 60 and 62 together. In addition the first radially extending flange 66 has a plurality of circumferentially spaced third apertures 78 extending axially there-through and the second radially extending flange 68 has a plurality of circumferentially spaced fourth apertures 80 extending axially there-through. The third and fourth apertures 78 and 80, more particularly the axes of the third and fourth apertures 78 and 80, respectively are circumferentially and radially aligned. A plurality of members 82 are provided and each member 82 is arranged to extend axially through a respective pair of the third and fourth apertures 78 and 80. Each member 82 has at least one circumferentially extending flange 84 and each circumferentially extending flange 84 has an aperture 86 extending axially there-though and each fastener 74 extends through an aperture 86 in a flange 84 of a member 82 to clamp the member 82 against the first flange 66. Each fastener 74 is a bolt and each fastener 74 has a respective nut 76. In this embodiment each member 82 has two circumferentially extending flanges 84 and each flange 84 has an associated aperture 86 extending axially there-through. Thus, two circumferentially adjacent fasteners 74 extend through the apertures 86 in the two circumferentially extending flanges 84 of each member 82.

The fasteners 74 comprise Tee headed bolts and nuts 76 or Dee headed bolts 74 and nuts 76. The first annular member, the combustion casing, 60 has a raised annular land 88 adjacent the first flange 66 and the heads of the bolts 74 are arranged to abut the raised annular land 88 to prevent rotation of the bolts 74. The heads of the Tee headed bolts, or Dee headed bolts, 74 are positioned upstream of the flanges 66 and 68 and the shanks of the bolts extend in a downstream direction from the heads and through the apertures 70 and 72 in the flanges 66 and 68 respectively and the flanges 84 of the members 82 are positioned upstream of the flanges 66 and 68 in this arrangement. Alternatively the heads of the Tee headed bolts, or the Dee headed bolts, 74 may be positioned downstream of the flanges 66 and 68 and the shanks of the bolts extend in an upstream direction from the heads and through the apertures 70 and 72 in the flanges 66 and 68 respectively and the flanges 84 of the members 82 are positioned downstream of the flanges 66 and 68.

In this arrangement a third annular member, casing, 92 has a third radially extending flange 94, the third radially extending flange 94 has a plurality of circumferentially spaced apertures 96 extending axially there-through and the apertures 70, 72 and 96 in the flanges 66, 68 and 94 are circumferentially and radially aligned. Thus each fastener 74 extends through a corresponding set of apertures 70, 72 and 96 in the flanges 66, 68 and 94. Also the third annular member, casing, 92 has a plurality of circumferentially spaced apertures 98 extending axially there-through and the apertures, the axes of the apertures, 78, 80 and 98 in the flanges 66, 68 and 94 are circumferentially and radially aligned. Thus each member 82 extends through a corresponding set of apertures 78, 80 and 98 in the flanges 66, 68 and 94.

It is a requirement to retain the ability to transfer the fan blade off event loads across the flanges 66, 94, 68 and provide radial location for downstream components, which was provided by the hollow dowels. In the present invention the members 82 are solid and are located away from the apertures 70, 72 and 96 in the flanges 66, 68 and 94 through which the fasteners 74 extend. These solid members 82 have a similar tolerance and clearance to the apertures 78, 80 and 98 as the hollow dowels in the apertures of the flanges. The number of members 82 and the dimensions of the members 82 are arranged such that the shear area provided by the members 82 is the same as that previously provided by the hollow dowels.

During assembly of the joint assembly 64 the flanges 66, 68 and 94 of the casings 60, 62 and 92 are arranged coaxially, the apertures 78, 80 and 98 are brought into circumferential and axial alignment and the apertures 70, 72 and 96 are brought into axial and circumferential alignment. Each member 82 is then inserted through a respective set of apertures 78, 80 and 98 through the flanges 66, 68 and 94 of the casings 60, 62 and 92. Each Dee, or Tee, headed bolt 74 is passed through one of the circumferentially extending flanges 84 on a respective member 82 and then through the respective set of apertures 70, 72 and 96 in the flanges 66, 68 and 94 of the casings 60, 62 and 92. The Dee, or Tee, headed bolts 74 pass through the circumferentially extending flanges 84 of the members 82 and clamp the members 82 to the flanges 66, 68 and 94 of the casings 60, 62 and 92, specifically against the flange 66 of the casing 60. In this arrangement two Dee, or Tee, headed bolts 74 are passed through the two circumferentially extending flanges 84 on each of the members 82. The Dee, or Tee, headed bolts 74 abut the raised annular land 88 of the casing 60 and thus the raised annular land 88 prevents the Dee, or Tee, headed bolts 74 from rotating. The circumferentially extending flanges 84 of the members 82 also abut the raised annular land 88 of the casing 60 and thus the raised annular land 88 prevents the member 82 from rotating. The member 82 and the circumferentially extending flanges 84 may be integral. The member 82 and the circumferentially extending flanges 84 may be manufactured by machining from a solid piece. The member 82 and the circumferentially extending flanges 84 may be separate pieces. The member 82 may be an interference fit in an aperture in a plate forming the flanges 84 or the member 82 may be welded, diffusion bonded, brazed, bonded etc onto a plate forming the flanges 84.

A further joint assembly 64B for an annular structure according to the present invention is shown in FIGS. 6 and 7 and this is substantially the same as that shown in FIGS. 2 to 5 and like parts are denoted by like numerals. The joint assembly 64B in FIGS. 6 and 7 differs in that each member 82B has an axially extending member 90B to prevent rotation of the bolts 74. The axially extending member 90B extends in an upstream direction away from the flanges 66, 68 and 94, whereas the member 82B extends axially downstream through the flanges 66, 68 and 94. The axially extending member 90B is positioned circumferentially between the two circumferentially extending flanges 84, extends in an upstream direction away from the circumferentially extending flanges 84 and is positioned circumferentially between the heads of two bolts 74. The axially extending member 90B has two flat substantially radial faces 100B against which the heads of the Tee headed bolts 74 or Dee headed bolts 74 abut to prevent rotation of the bolts 74. The Dee, or Tee, headed bolts 74 do not abut a raised annular land of the casing 60 in this arrangement.

Figure 8:
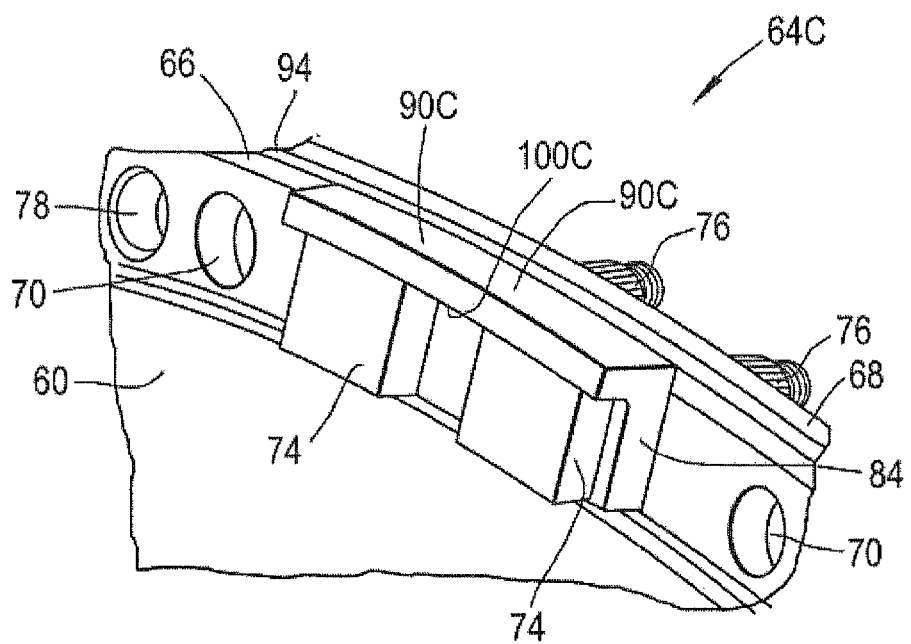
FIG. 8 is an enlarged perspective view of a portion of a further joint assembly according to the present invention.

A further joint assembly 64C for an annular structure according to the present invention is shown in FIG. 8 and this is substantially the same as that shown in FIGS. 2 to 5 and like parts are denoted by like numerals. The joint assembly 64C in FIG. 8 differs in that each member 82C has an axially extending member 90C to prevent rotation of the bolts 74. The axially extending member 90C comprises a flange extending in an upstream direction and circumferentially and being positioned at the radially outer end of the member 82C. The axially extending member 90C has a circumferential extending face 100C against which the radially outer ends of the heads of the Tee headed bolts 74 or Dee headed bolts 74 abut to prevent rotation of the bolts 74. The Dee, or Tee, headed bolts 74 do not abut a raised annular land of the casing 60 in this arrangement.

Thus the present invention allows the radial height of the flanges 66, 68 and 94 of the casings 60, 62 and 92 to be reduced, minimised. This reduction in the radial height of the flanges 66, 68 and 94 results in an increase in the life of the flanges 66, 68 and 94 of the casings 60, 62 and 94, a decrease in the weight of the casings 60, 62 and 92 and a decrease in the manufacturing costs of the casings 60, 62 and 92 due to a reduction in the size of the forging.

The circumferentially extending flanges 84 may be arranged to extend to a greater radial diameter than that of the radial outer diameter of the flanges 66, 68 and 94. Bolt holes may be provided through the circumferentially extending flanges 84 at a radius greater than the outer diameter of the flanges 66, 68 and 94 to enable brackets or other components onto the members 82 to secure pipes, valves, wires etc to the combustor casing 60 or turbine casing 62.

Figure 2:
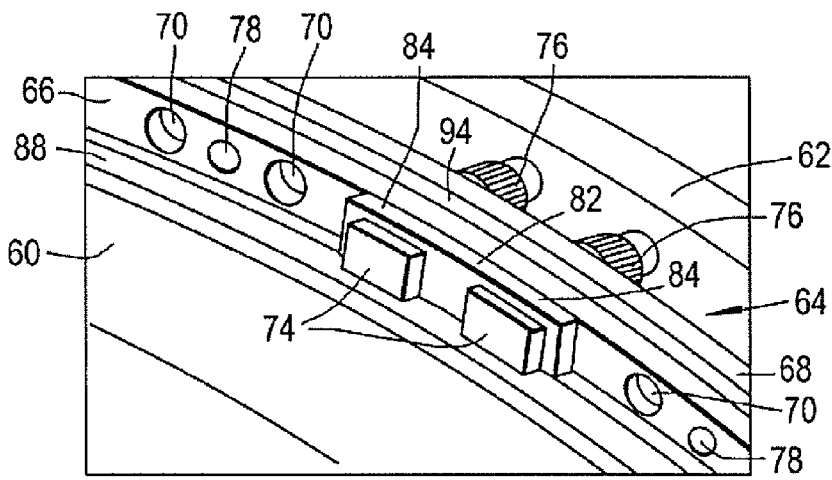
FIG. 2 is an enlarged perspective view of a portion of a joint assembly according to the present invention.
Figure 3:
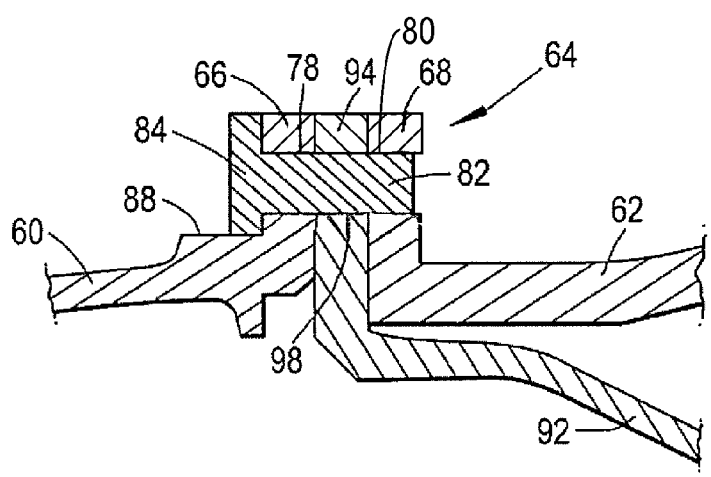
FIG. 3 is a cross-sectional view along line A-A in FIG. 2.
Figure 4:
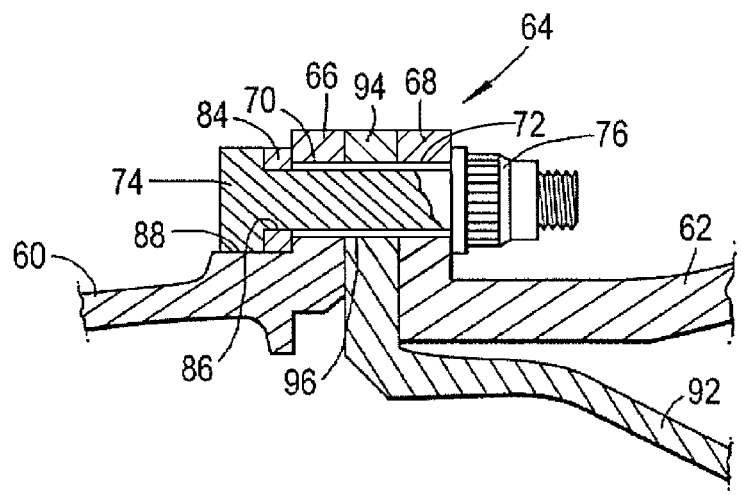
FIG. 4 is a cross-sectional view along line B-B in FIG. 2.

As an alternative to using Dee, or Tee, headed bolts to fasten the casings 60, 62 and 92 together it may be possible to use shank nuts and conventional bolts. In this arrangement the shank nuts are secured to the circumferentially extending flanges 84 and reacted against a raised annular land 88 of the casing 60 as shown in FIGS. 2 to 4 or against axially extending features 90B, 90C on the circumferentially extending flanges 84 as shown in FIGS. 6 and 7 or FIG. 8.

Figure 9:
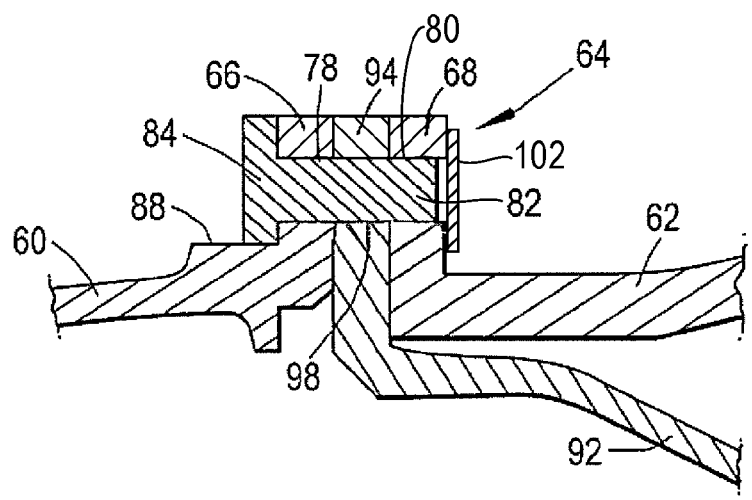
FIG. 9 is a cross-sectional view corresponding to FIG. 3 with plates being additionally provided clamped against the second flange.
Figure 10:
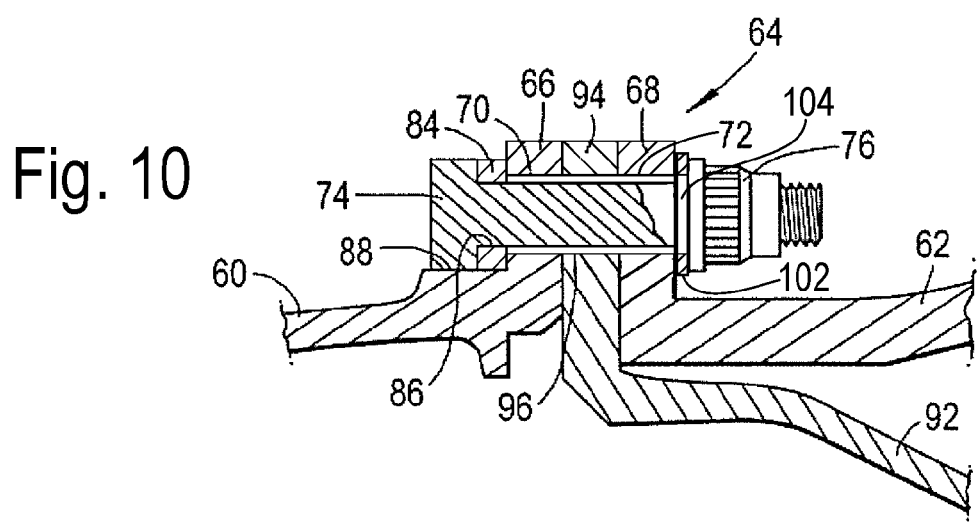
FIG. 10 is a cross-sectional view corresponding to FIG. 4 with plates being additionally provided clamped against the second flange.

All of these joint assemblies 64, 64B and 64C may comprise a plurality of plates 102, each plate 102 having an aperture 104 as shown in FIGS. 9 and 10, each fastener 74 extending through an aperture 104 in a plate 102 and locating an associated nut 76 to clamp the plate 102 against the second flange 68. These plates 102 would cover the apertures 80 in the flange 68 of the turbine casing 62 and reduce any leakage through the apertures 78, 80 and 94 in the flanges 66, 68 and 94 of the casing 60, 62 and 92. In addition the plates 102 would provide improved load spreading into the flange 68 under the nuts 76 to improve overall flange sealing.

Although the present invention has been described with reference to joining three casings together it is equally applicable to joining two or more casings together. Although the present invention has been described with reference to joining casings together it is equally applicable to joining annular members together.

Although the present invention has been described with reference to joining a first annular member, a combustion casing, and a second annular member, a turbine casing, it is equally applicable for joining a compressor casing to a combustion casing or a fan casing to an intake casing of a gas turbine engine.

The annular members may be circular in cross-section or may be any suitable polygon in cross-section.

The invention claimed is:

1. A joint assembly for an annular structure comprising:
   a first annular member which is a casing having a first radially extending flange;
   a second annular member which is a casing having a second radially extending flange, the first radially extending flange having a plurality of circumferentially spaced first apertures extending axially there-through, the second radially extending flange having a plurality of circumferentially spaced second apertures extending axially there-through, the first and second apertures being circumferentially aligned;
   a plurality of fasteners, each fastener being arranged to extend through a respective pair of the first and second apertures to join the first and second annular members together, the first radially extending flange having a plurality of circumferentially spaced third apertures extending axially there-through, the second radially extending flange having a plurality of circumferentially spaced fourth apertures extending axially there-through, the third and fourth apertures being circumferentially aligned; and
   a plurality of extending members, a first extending member of the plurality of extending members being arranged to extend axially through a respective pair of the third and fourth apertures, the first extending member having at least one circumferentially extending flange, each circumferentially extending flange having an extending member aperture extending axially there-through and a first fastener of the plurality of fasteners extending through the extending member aperture in the at least one circumferentially extending flange of the first extending member to clamp the first extending member against the first flange, the first fastener further extending through the respective pair of the first and second apertures.

2. A joint assembly as claimed in claim 1 wherein the at least one circumferentially extending flange of the first extending member has two circumferentially extending ends, the two circumferentially extending ends extending in opposite circumferential directions from each other, the at least one circumferentially extending flange has two extending member apertures extending axially there-through, one of the two extending member apertures being arranged in one of the two circumferentially extending ends, and the other of the two extending member apertures being arranged in the other of the two circumferentially extending ends, and the first fastener extends through the one of the two extending member apertures and through the respective pair of the first and second apertures, and a second fastener of the plurality of fasteners extends through the other of the two extending member apertures and through another respective pair of the first and second apertures.

3. A joint assembly as claimed in claim 2 wherein
each extending member has an axially extending member to prevent rotation of the bolts.

4. A joint assembly as claimed in claim 3 wherein
the axially extending member is positioned circumferentially between the two circumferentially extending ends and between the heads of two bolts.

5. A joint assembly as claimed in claim 3 wherein
the axially extending member comprises a flange extending circumferentially and being positioned at the radially outer end of the extending member.

6. A joint assembly as claimed in claim 1 wherein
the fasteners are selected from the group consisting of Tee headed bolts and nuts and Dee headed bolts and nuts.

7. A joint assembly as claimed in claim 6 wherein
the first annular member having a raised annular land adjacent the first flange and the heads of the bolts being arranged to abut the raised annular land to prevent rotation of the bolts.

8. A joint assembly as claimed in claim 1 comprising
a plurality of plates, each plate having a plate aperture, at least one of the fasteners extending through the plate aperture in each plate and locating an associated nut to clamp each plate against the second flange, each plate being arranged to cover a respective one of the fourth apertures of the second annular member.

9. A joint assembly as claimed in claim 1 wherein
the fasteners comprise shank nuts and bolts, the shank nuts being secured to the flange of the extending member.

10. A joint assembly as claimed in claim 1 comprising
a third annular member having a third radially extending flange, the third radially extending flange having a plurality of circumferentially spaced fifth apertures extending axially there-through, the first, second and fifth apertures being circumferentially aligned, the third radially extending flange having a plurality of circumferentially spaced sixth apertures extending axially there-through, the third, fourth and sixth apertures being circumferentially aligned.

11. A gas turbine engine comprising a joint assembly as claimed in claim 1.

12. A gas turbine engine as claimed in claim 11 wherein
the first annular member is a combustion casing and the second annular member is a turbine casing.

13. A joint assembly for an annular structure comprising:
a first annular member having a first radially extending flange;
a second annular member having a second radially extending flange, the first radially extending flange having a plurality of circumferentially spaced first apertures extending axially there-through, the second radially extending flange having a plurality of circumferentially spaced second apertures extending axially there-through, the first and second apertures being circumferentially aligned;
a plurality of fasteners, each fastener being arranged to extend through a respective pair of the first and second apertures to join the first and second annular members together, the first radially extending flange having a plurality of circumferentially spaced third apertures extending axially there-through, the second radially extending flange having a plurality of circumferentially spaced fourth apertures extending axially there-through, the third and fourth apertures being circumferentially aligned; and
a plurality of extending members, each extending member being arranged to extend axially through a respective pair of the third and fourth apertures, each extending member having at least one circumferentially extending flange, each circumferentially extending flange having an extending member aperture extending axially there-through, each extending member being a cylindrical member and having an unthreaded cylindrical surface, and at least one of the fasteners extending through the extending member aperture in the at least one circumferentially extending flange of each extending member to clamp the extending member against the first flange,
each fastener comprising a bolt and each bolt having a respective nut, each bolt comprising a head and a shank, the shank of each bolt extending through the respective pair of the first and second apertures into the nut, the head of each bolt abutting the at least one circumferentially extending flange of each extending member and clamping the at least one circumferentially extending flange of each extending member directly against the first flange.

14. A joint assembly for an annular structure comprising:
a first annular member having a first radially extending flange;
a second annular member having a second radially extending flange, the first radially extending flange having a plurality of circumferentially spaced first apertures extending axially there-through, the second radially extending flange having a plurality of circumferentially spaced second apertures extending axially there-through, the first and second apertures being circumferentially aligned;
a plurality of fasteners, each fastener being arranged to extend through a respective pair of the first and second apertures to join the first and second annular members together, the first radially extending flange having a plurality of circumferentially spaced third apertures extending axially there-through, the second radially extending flange having a plurality of circumferentially spaced fourth apertures extending axially there-through, the third and fourth apertures being circumferentially aligned; and
a plurality of extending members, each extending member being arranged to extend axially through a respective pair of the third and fourth apertures, each extending member having at least one circumferentially extending flange, each circumferentially extending flange having an extending member aperture extending axially there-through, each extending member being a cylindrical member and having an unthreaded cylindrical surface, and at least one of the fasteners extending through the extending member aperture in the at least one circumferentially extending flange of each extending member to clamp the extending member against the first flange, each fastener comprising a bolt and each bolt having a respective nut, each bolt comprising a head and a shank, the shank of each bolt extending through the respective pair of the first and second apertures into the nut, each nut abutting the at least one circumferentially extending flange of each extending member and clamping the at least one circumferentially extending flange of each extending member directly against the first flange.

* * * * *